R. R. FOSTER.
PROCESS OF HEATING WATER.
APPLICATION FILED JULY 30, 1912.
1,069,121.
Patented Aug. 5, 1913.
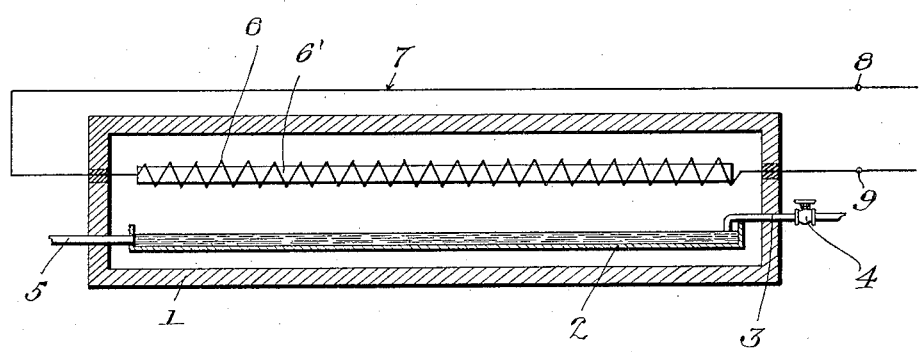

UNITED STATES PATENT OFFICE.

ROY RALEIGH FOSTER, OF COLTON, CALIFORNIA.

PROCESS OF HEATING WATER.

1,069,121.  Specification of Letters Patent.  Patented Aug. 5, 1913.

Application filed July 30, 1912. Serial No. 712,353.

*To all whom it may concern:*

Be it known that I, ROY RALEIGH FOSTER, a citizen of the United States, residing at Colton, in the county of San Bernardino and State of California, have invented a new and useful Process of Heating Water, of which the following is a specification.

This invention relates to heating water by means of electric current, and the main object of the invention is to provide for heating the water in an economical and effective manner, while the water is flowing, to the desired temperature.

Another object of the invention is to provide for heating the water without necessitating passage of heat through conducting walls or plates.

Another object of the invention is to provide for heating the water, while in an open or exposed condition and while traveling under the action of gravity in counter-distinction to water heating methods which involve the flow of water through pipes under pressure.

The accompanying drawing illustrates one form of apparatus suitable for carrying out the invention.

The apparatus comprises a box or case 1 of any suitable material, a pan or plate 2 in said box or case, adapted to receive water, and means such as a supply pipe 3, provided with a valve 4 for supplying water to said pan or plate, outlet means such as a pipe 5 for the water, and an electric heating element 6 located in the box or case above the water receiving member, so as to heat the water by direct radiation from the heating element. Said heating element may consist of a wire wound on a support 6', said wire being connected by wire 7 to terminals 8, 9 of a supply circuit.

The process is carried out in the above described apparatus as follows: Water is supplied to the water receiving member 2 by means of the pipe 3 and is drawn off through pipe 4, so that the water passes in a continuous stream over said water receiving member, the upper face of said water being exposed and the water passing through the apparatus by the operation of gravity without the use of pressure. While the water is so passing, current is turned on through the heating element 6 and the heat from said element is radiated onto the water below the same and being taken up by the water, causes the water to be heated in its passage over the water receiving member.

The process is instantaneous, that is, while the water is being drawn for use, it is heated so quickly that it is drawn hot from the pipe. While it is exposed to the electric heat it is spread out over a large area in a thin film, which has the advantage of presenting a large water surface which quickly absorbs the heat.

What I claim is:

1. The process of heating water which consists in flowing the water in a layer over a supporting surface, with no obstructions between the water and heating means and causing heat to be radiated downward through the intervening air onto said layer of water from above the same.

2. The process of heating water which consists in flowing the water in a layer on a supporting surface, with no obstructions between the water and heating means generating heat in a body above said layer of water and causing the heat from said body to be radiated through the intervening air onto said layer of water.

3. The process of heating water which consists in causing the water to flow by gravity in an exposed thin layer over a supporting surface, with no obstructions between the water and heating means and causing heat to be radiated from above through the intervening air onto said layer of water.

In testimony whereof, I have hereunto set my hand at Colton, California, this 23rd day of July, 1912.

ROY RALEIGH FOSTER.

In presence of—
C. W. CURTIS,
B. F. TANNER.

---

Copies of this patent may be obtained for five cents each, by addressing the "Commissioner of Patents, Washington, D. C."